(12) United States Patent
Dong (10) Patent No.: US 7,174,830 B1
(45) Date of Patent: Feb. 13, 2007

(54) ROBOTIC COOKING SYSTEM

(76) Inventor: Dawei Dong, 38736 Almaden Pl., Fremont, CA (US) 94536

( * ) Notice: Subject to any disclaimer, the term of this patent is extended or adjusted under 35 U.S.C. 154(b) by 446 days.

(21) Appl. No.: 10/456,016

(22) Filed: Jun. 5, 2003

(51) Int. Cl.
A47J 27/14 (2006.01)
A47J 43/00 (2006.01)

(52) U.S. Cl. ............................ 99/334; 99/348; 99/352; 99/357; 99/423; 99/443 C; 901/1

(58) Field of Classification Search ................ 99/326, 99/331, 386, 325, 334, 443 C, 486, 423, 99/357, 348, 352; 901/1; 426/231, 233, 426/523
See application file for complete search history.

(56) References Cited

U.S. PATENT DOCUMENTS

| | | | | |
|---|---|---|---|---|
| 4,503,502 A | * | 3/1985 | Chapin | 700/90 |
| 4,700,617 A | * | 10/1987 | Lee et al. | 99/327 |
| 4,919,950 A | * | 4/1990 | Mak | 426/233 |
| 4,922,435 A | * | 5/1990 | Cahlander et al. | 700/247 |
| 5,088,390 A | * | 2/1992 | Wong et al. | 99/327 |
| 5,249,914 A | * | 10/1993 | Cahlander et al. | 414/793.4 |
| 5,386,762 A | * | 2/1995 | Gokey | 99/326 |
| 6,317,652 B1 | * | 11/2001 | Osada | 700/245 |
| 6,843,166 B1 | * | 1/2005 | Li | 99/327 |

OTHER PUBLICATIONS

FANUC. Sep. 2001. http://www.fanuc.co.jp/en/news/2001/0109/0109_cookingcenter.htm.*
Restaurants USA. Oct. 2000. http://web.archive.org/web/20021204035252/http://www.restaurant.org/business.magarticle.cfm?ArticleID=144.*
Epinions.com. Apr. 2001. http://www.epinions.com/content_15976861316.*

* cited by examiner

Primary Examiner—Reginald L. Alexander
(74) Attorney, Agent, or Firm—The Kline Law Firm (57) ABSTRACT

An automated system of preparing food designed with the preparation of Chinese food in mind, the system can be adapted to whatever type of food is desired by the user. The system uses one or more robots as the "chefs". A heating element heats a cooking pan to a desired temperature. The cooking pan includes a temperature sensing element to monitor heating of the pan and cooking of the food. When the pan is fully heated, a delivery arm empties the contents of the bowl into the cooking pan to being the actual cooking. When the contents of the pan have reached the correct temperature to be "done", the robot empties the contents into a serving dish, and the food is ready to be eaten.

7 Claims, 8 Drawing Sheets

ROBOTIC COOKING SYSTEM

BACKGROUND OF THE INVENTION

1. Field of the Invention

The present invention relates generally to an automated cooking process, and more particularly is a robotic cooking system that can be installed in a truck or portable trailer for easy transport.

2. Description of the Prior Art

Throughout history, cooking has been an area of constant experimentation. Recipes are of course endlessly being modified, but preparation techniques are also continually being improved. These improvements are aimed at both improving the quality of the product, and also reducing the time and labor required for preparation of food. Reducing time and labor for preparation reduces the cost of the food product, and the manpower requirements for a food service operation.

Vending machines are one example of a food service system with minimal human intervention. The chief drawback to vending machines is their limited menu, and their inability to offer freshly prepared, hot food. Quick service (fast food) restaurants can supply freshly prepared, hot food, but those operations are very labor intensive.

Accordingly, it is an object of the present invention to provide a method of preparing food automatically, so that labor requirements are reduced.

It is another object of the present invention to provide a system that allows easy portability of the food preparation equipment.

It is still another object of the present invention to provide an entertaining dining experience.

SUMMARY OF THE INVENTION

The present invention is an automated system of preparing food. While the system was designed with the preparation of Chinese food in mind, the system can clearly be adapted to whatever type of food is desired by the user. The system uses one or more robots as the "chefs". In the fully automated version, the user selects the food he wants from a display menu, and enters his choices along with special cooking instructions, such as lightly steamed or well done. In the semi-automatic version of the system, the user selects the desired foods from a refrigerated table.

As the food is being selected, a heating element heats a cooking pan to a desired temperature. The cooking pan includes a temperature sensing element to monitor heating of the pan and cooking of the food. When the pan is fully heated, a delivery arm empties the contents of the bowl into the cooking pan to being the actual cooking. When the contents of the pan have reached the correct temperature to be "done", the robot empties the contents into a serving dish, and the food is ready to be eaten.

An advantage of the present invention is that manpower required to operate a restaurant is drastically reduced.

Another advantage of the present invention is that it allows the customer to select the exact ingredients he wants, and to watch the food being prepared.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
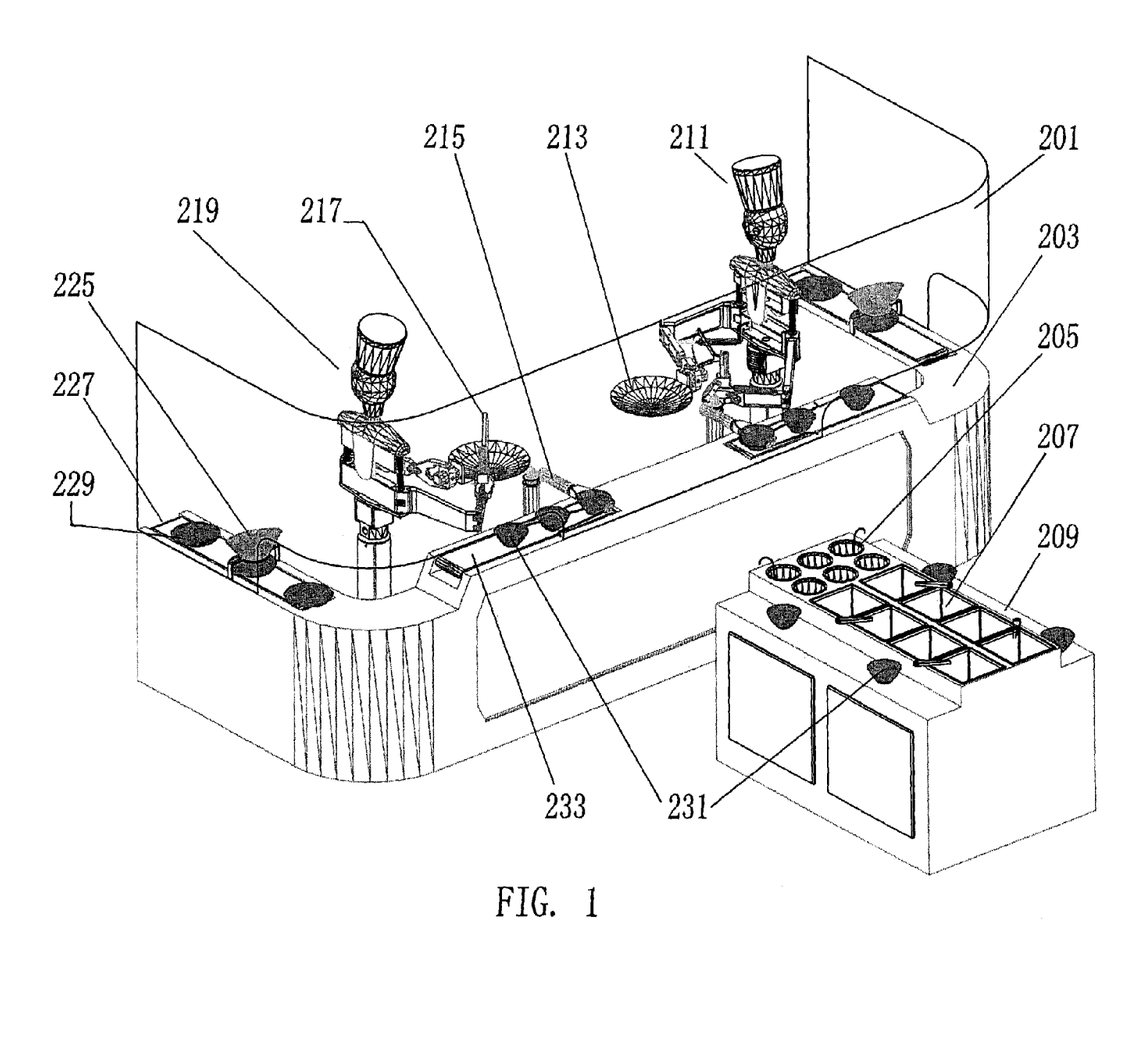
FIG. 1 is a perspective view of the automatic cooking system of the present invention.

The present invention is an automated system of preparing food. As illustrated in FIG. 1, the first preferred embodiment is semi-automated, and includes at least a first robot 211 and a second robot 219. While in the semi-automatic version of the system, the user does load the food to be cooked into bowls, the robots 211, 219 perform the actual cooking operation. The robots 211, 219 are constructed so as to appear somewhat human in form, including a torso, arms, and a head complete with a facsimile of a chef's hat. Since the robots 211 and 219 are identical, and only one is strictly required for the system to be viable, the process will be described with reference only to the first robot 211.

The process begins with a user choosing his food from a refrigerated table 209. The refrigerated table 209 holds assorted menu items that are stored in multiple compartments 207, as well as various condiment bowls 205. The user selects as many dishes as he wants, and loads the food into bowls 231. The bowls 231 are placed on a loading conveyor 233.

Figure 2A:
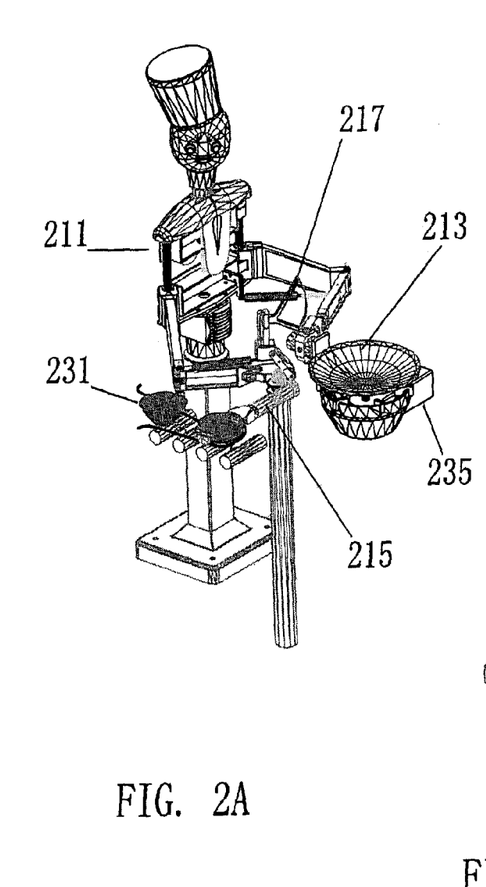
FIGS. 2A–C shows multiple robot positions in the cooking process.
Figure 2B:
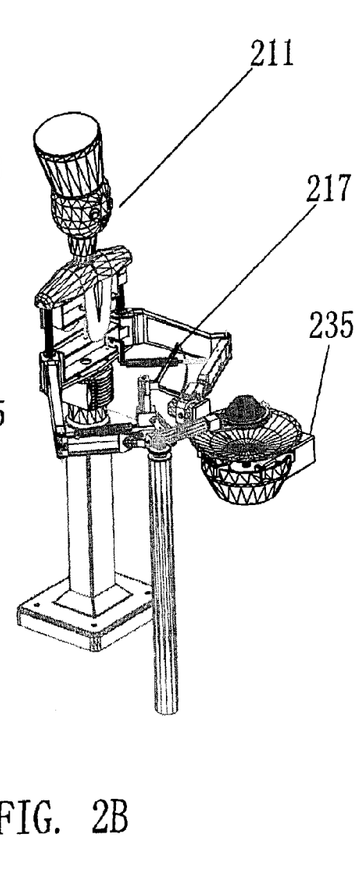
Figure 2C:
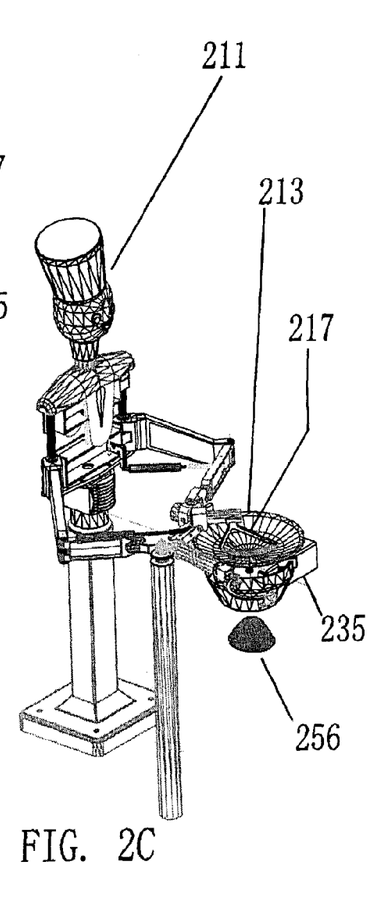

Referring now to FIGS. 2A–C, the robot 211 holds the cooking pan 213 over a cooking element 235. When the robot 211 detects the proper cooking temperature of the pan 213 via a temperature control sensor located in the pan 213, the robot 211 activates a delivery arm 215. The delivery arm 215 picks the bowls 231 from the loading conveyor 233 and loads the contents of the bowl 231 into a cooking pan 213 held by the robot 211. The delivery arm 215 discards into a holding area 256 the now empty bowl 231, and returns to the picking position at the end of the conveyor 233. Simultaneously, the robot 211 moves its stirring ladle 217 into the cooking pan 213.

Figures 3A, 3B, 3C:
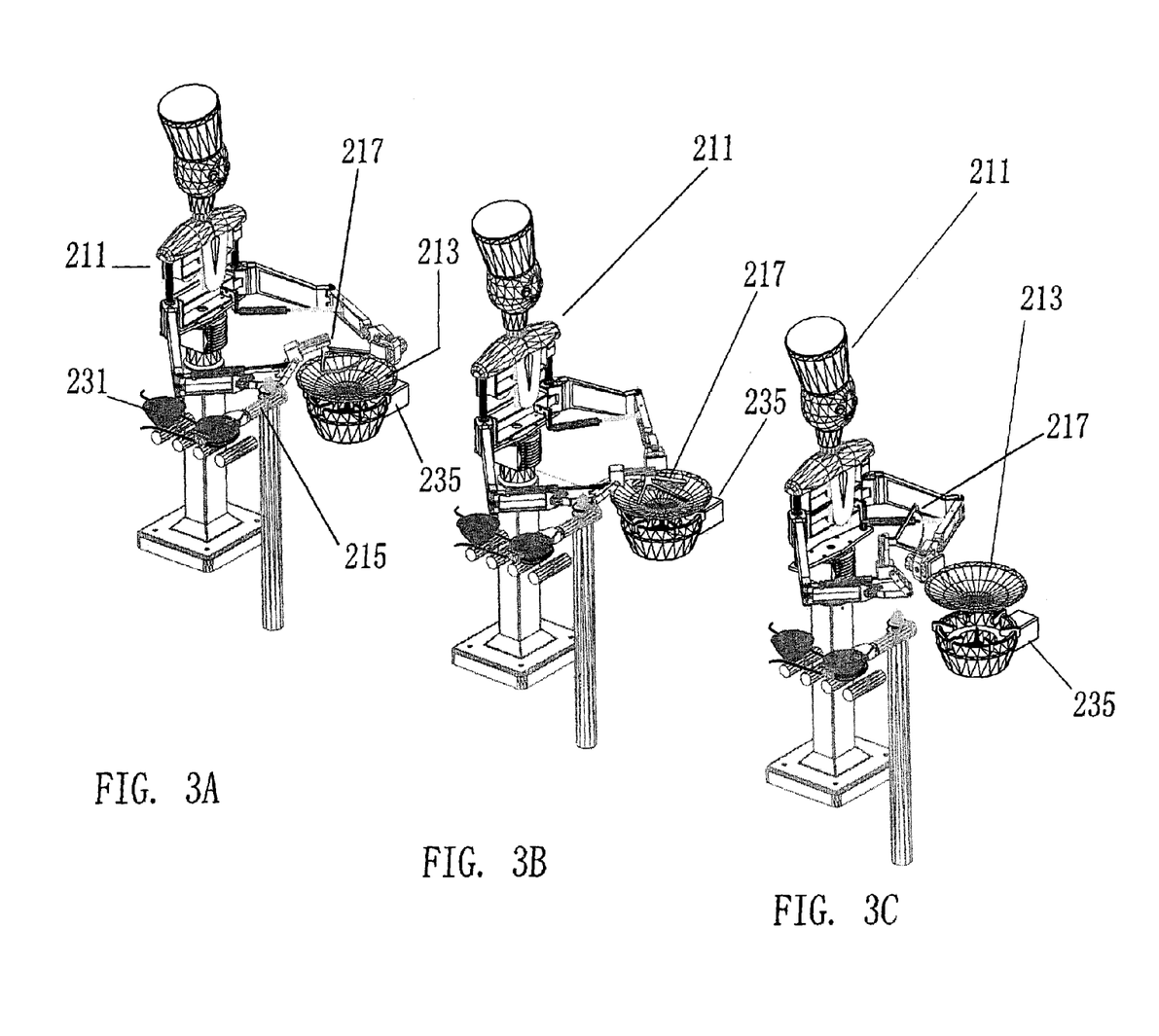
FIGS. 3A–C shows further multiple robot positions in the cooking process.

Referring now to FIGS. 3A–C, the robot 211 continuously rotates the ladle 217 in the cooking pan 213 as the food cooks to achieve a stir fry process. The robot 211 stirs the food until it is fully cooked, and then lifts ladle 217 from the cooking pan 213. The cooking pan 213 is then removed from the cooking element 235.

Figures 4A, 4B, 4C:
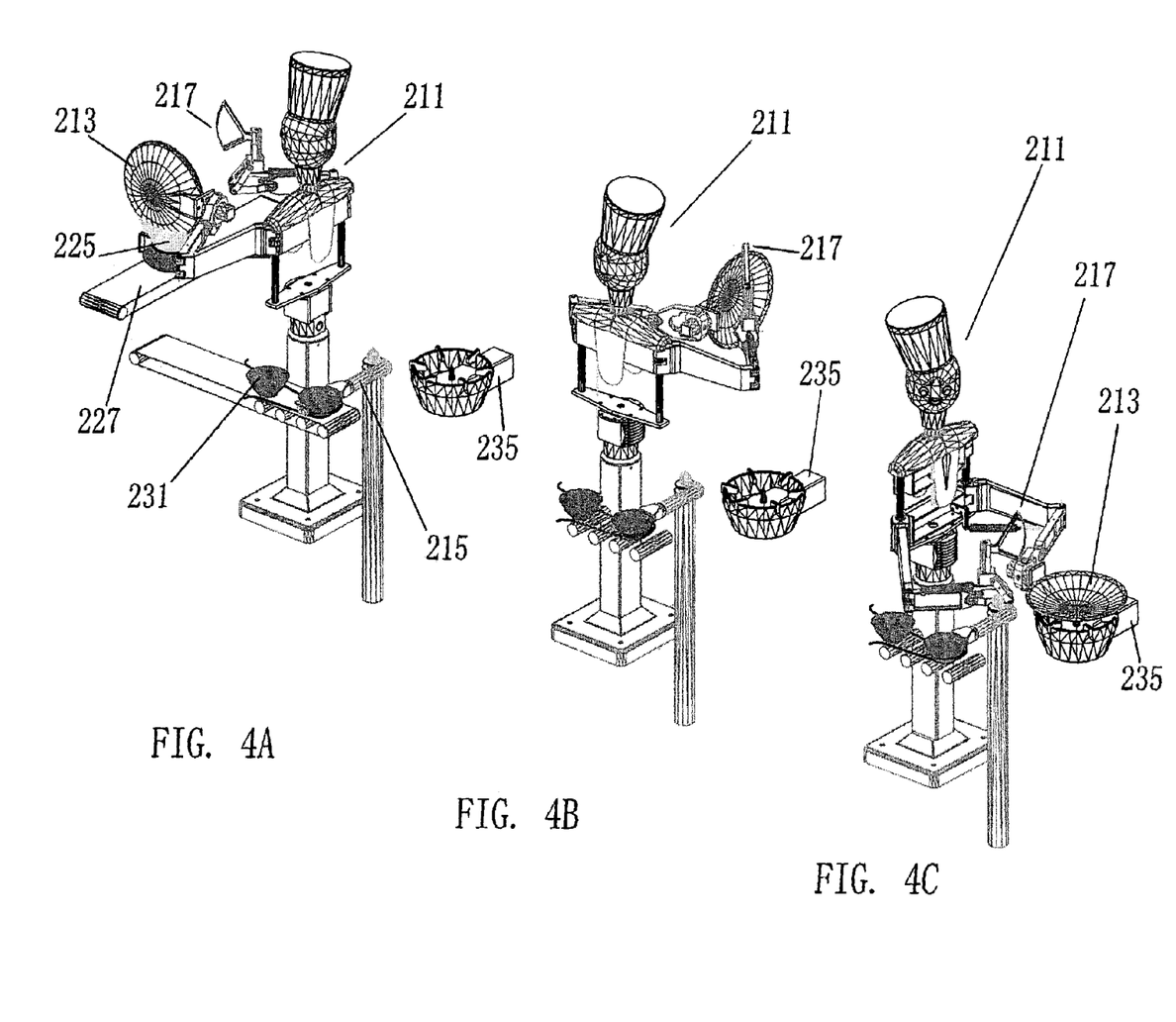
FIGS. 4A–C shows still further multiple robot positions in the cooking process.

Referring now to FIGS. 4A–C, the robot 211 pivots to move the food in the cooking pan 213 to a serving area. The food is tipped out of the cooking pan 213 into a protective funnel 225 to avoid spillage. The food flows out of the funnel 225 and into a serving bowl 231. A second conveyor 227 moves the bowl 231 to a receiving area where it is picked up by the user. Meanwhile, the robot 211 moves the cooking pan 213 to a cleaning area where the pan 213 is washed. The robot then returns the pan 213 to the start position over the cooking element 235, so that the system is ready to prepare the next dish.

Figure 5:
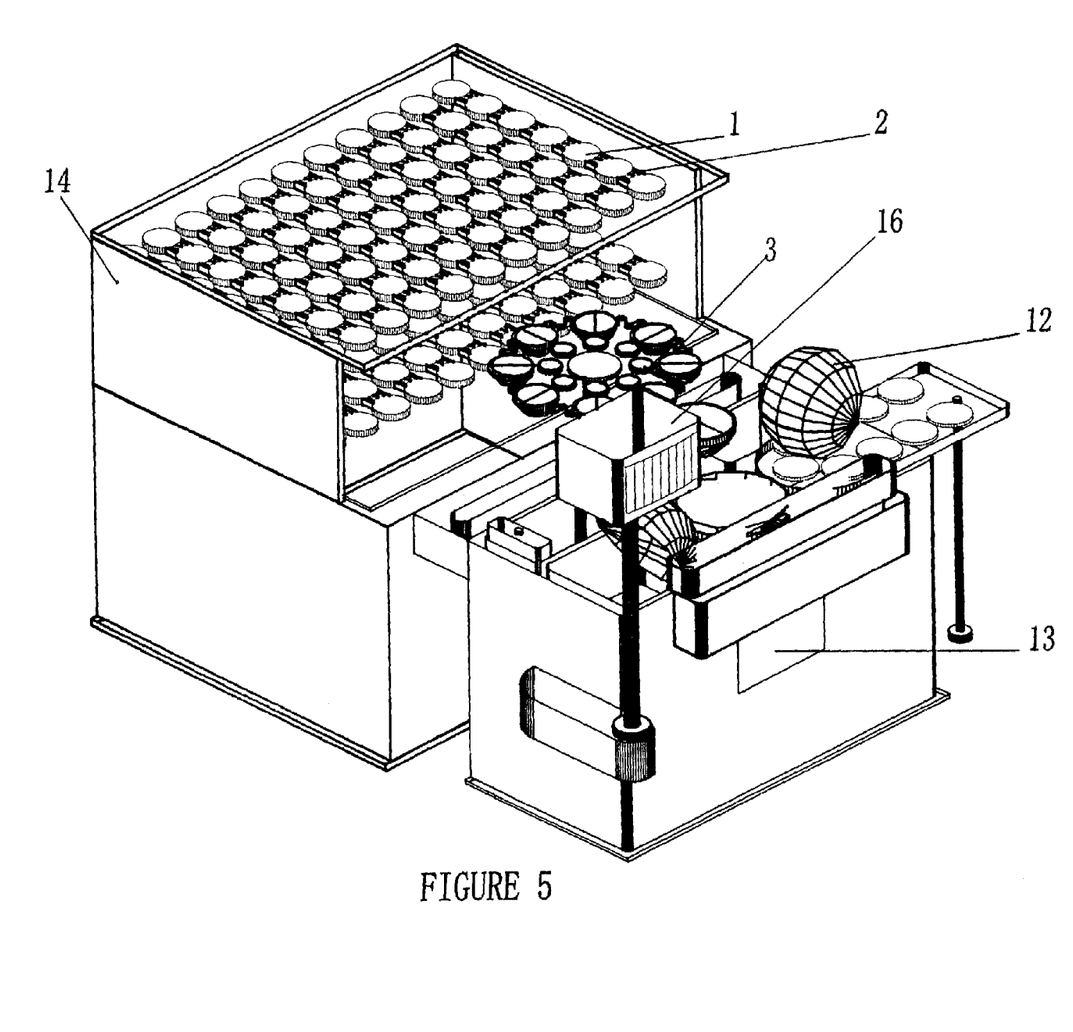
FIG. 5 shows a completely automated cooking system that does not use the robot cookers.
Figure 6:
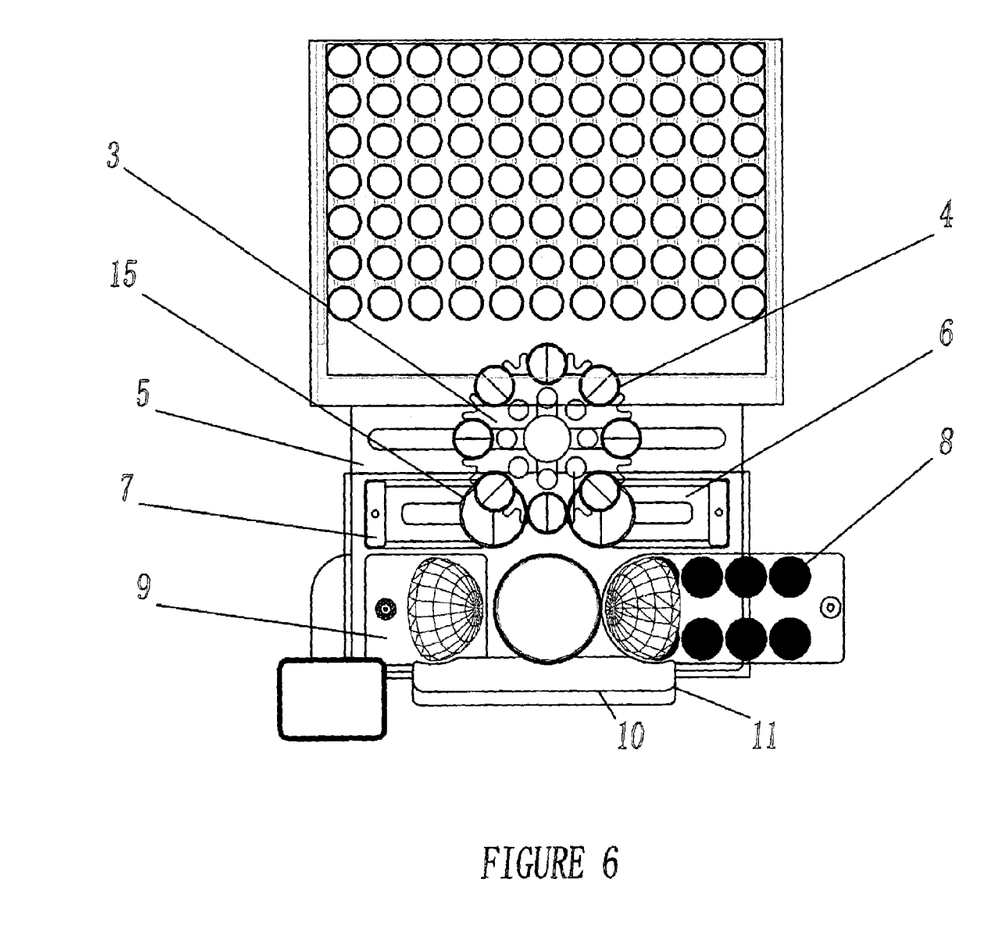
FIG. 6 is an overhead view of the system shown in FIG. 5.

Referring now to FIGS. 5 and 6, a second preferred embodiment of the cooking system of the present invention is completely automated. To begin the cooking process, a user selects items from a menu which is stored in a controlling computer and shown on a display panel 16. At the same time, the user can choose the food style he prefers, such as well done or less cooked, what types and levels of seasonings, etc. On the basis of the user's inputs, the computer generates an operation list to instruct the cooking mechanism to select ingredients and seasonings, quantity, timing, temperature control, and the sequence of the cooking procedure.

After the item to be prepared has been selected and the preparation variables set, a conveyer 2 is activated. The conveyor 2 loads the appropriate ingredients and seasonings contained in multiple dishes 1 into turntable 3. Then a cooking element 13 heats a main cooking pot 10 to the correct temperature and maintains that temperature automatically. A pre-cooking oil pot 6 and a hot water pot 7 are provided and may be used to pre-cook ingredients if required. A strainer 15 is also provided.

Following the commands of the controlling computer, the turntable 3 then individually loads the ingredients and seasonings that have been selected into the main cooking pot 10. The ingredients and seasonings are cooked to the proper level, and then the main cooking pot 10 empties the food into receptacles 8. The receptacles 8 may be either serving dishes or delivery boxes. Using the combination of the oil pot 6 and the hot water pot 7, the device is able to steam, boil, and stir-fry the selected dishes. Following the preparation of a dish, the main cooking pot 10 is moved to the sink 9 to be cleaned. The cooking pot 10 is then returned to its start position in readiness for the next dish to be cooked.

Figure 7:
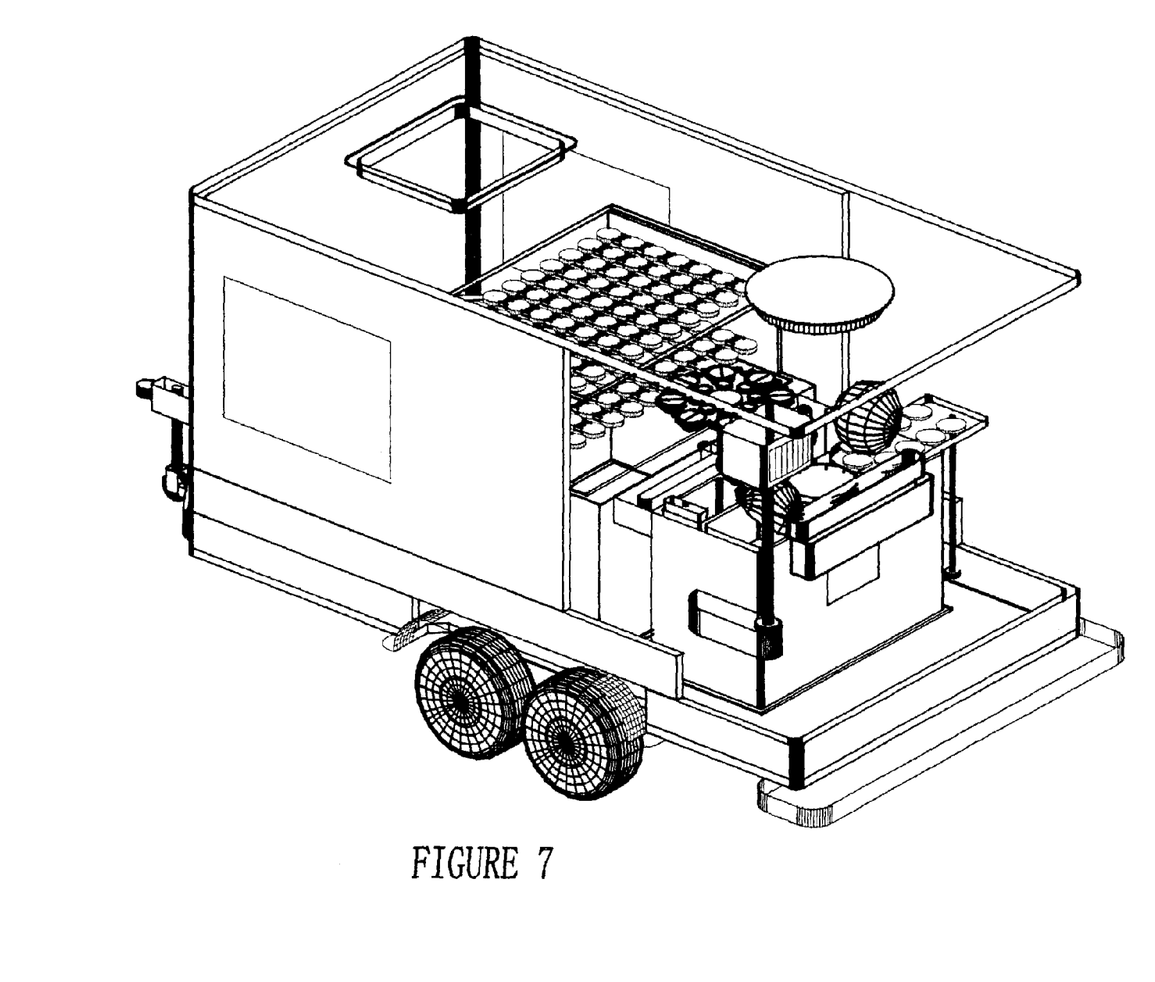
FIG. 7 illustrates an automated cooking system installed in a portable trailer.
Figure 8:
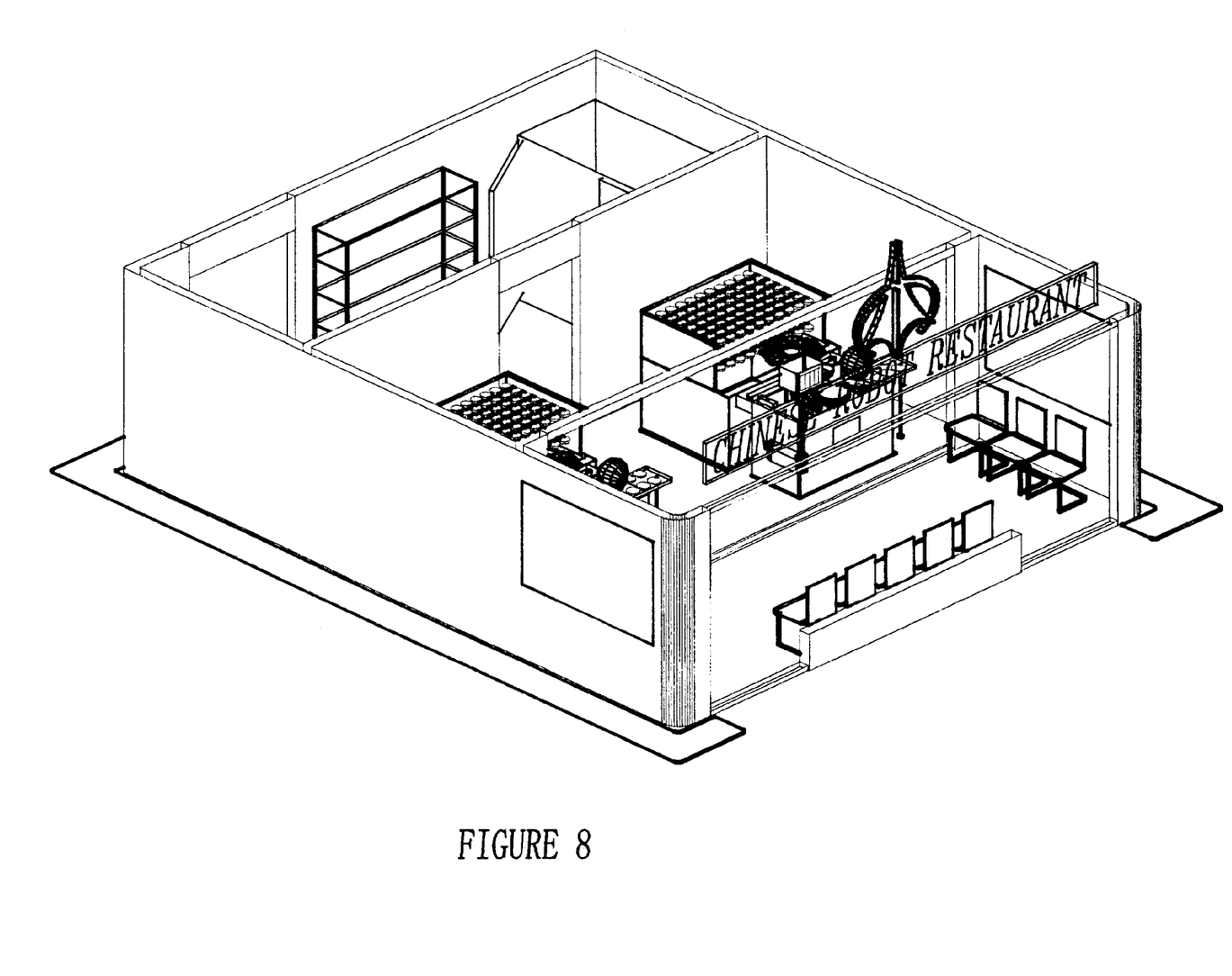
FIG. 8 is a schematic layout of a restaurant utilizing an automated cooking system according to the present invention.

With the cooking system of the present invention, it is quite simple to develop a portable automated cooking system. FIG. 7 illustrates just such a system. This system has the entire cooking mechanism mounted onto a portable platform, in this case, a trailer. A truck or van could as easily be used as the platform to move the cooking mechanism. FIG. 8 illustrates the fully automated system as it would be implemented in a fixed store front.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. An apparatus for preparing food comprising:
    at least one robot with at least one means to move food containers between multiple positions and at least one means to stir food within a cooking pan,
    a food storage and selection area,
    a cooking area within a range of motion of said robot,
    at least one food container containing a food to be cooked, and
    a loading conveyor to move said food container to a cooking area; wherein
    controlling software of said robot is programmed by a user with cooking instructions for said food,
    said robot uses said means to move food containers to move said food from said loading conveyor into a cooking pan that is held by said robot, said robot further comprising a means to hold said cooking pan in a position over a cooking element in said cooking area and to hold said food while said food is cooked until a sensor detects a correct finished temperature, and
    said robot uses said means to move food containers to unload said food into a serving dish, said serving dish being moved by a conveyor to a serving area where said serving dish is picked up by a user; and wherein
    said robot and said cooking area are mounted on a means for transportation so that said apparatus is portable.

2. The cooking apparatus of claim 1 wherein:
    said food to be cooked is loaded into said food container by said robot.

3. The cooking apparatus of claim 1 wherein:
    said food to be cooked is chosen by a user from a menu on a display screen.

4. The cooking apparatus of claim 1 wherein:
    said cooking pan is automatically cleaned after said food is cooked and before said cooking pan is returned to a start position.

5. The cooking apparatus of claim 1 wherein:
    said robot is constructed with a human appearance.

6. The cooking apparatus of claim 5 wherein:
    said robot comprises a torso, arms, and a head topped with a facsimile of a chef's hat.

7. The cooking apparatus of claim 1 wherein:
    said robot and said cooking area are contained in a restaurant building.

* * * * *